(12) United States Patent
Lee

(10) Patent No.: US 7,489,775 B2
(45) Date of Patent: Feb. 10, 2009

(54) INPUT METHOD USING STANDARD NUMERIC KEYPAD

(75) Inventor: Jun-Yih Lee, Kaohsiung (TW)

(73) Assignee: TelePac Technology Inc., Taipei (TW)

( * ) Notice: Subject to any disclaimer, the term of this patent is extended or adjusted under 35 U.S.C. 154(b) by 979 days.

(21) Appl. No.: 10/995,381

(22) Filed: Nov. 24, 2004

(65) Prior Publication Data

US 2008/0008310 A1     Jan. 10, 2008

(51) Int. Cl.
*H04M 1/00* (2006.01)
(52) U.S. Cl. ...................................... 379/368
(58) Field of Classification Search .................. 379/368
See application file for complete search history.

(56) References Cited

U.S. PATENT DOCUMENTS 7,054,440 B2 * 5/2006 Swerup et al. ......... 379/433.06

2002/0077808 A1 * 6/2002 Liu et al. ...................... 704/10

* cited by examiner

*Primary Examiner*—Ramnandan Singh
(74) *Attorney, Agent, or Firm*—Troxell Law Office PLLC

(57) ABSTRACT

An input method using standard numeric keypad which complies with CCITT standards and comprises a plurality of CCITT standard keys is disclosed. Each CCITT standard key has a corresponding CCITT key value. The method comprises the steps of: reassigning a first CCITT key value with an actuating key value of a first function; checking if the first CCITT key value is input, if "YES" then actuating the first function to reassign every CCITT key value with a new input key value of predetermined function; and, checking if any CCITT key value is input, if "YES" then performing the predetermined function corresponding to that input CCITT key value based on the first function. Therefore, all functions of the input method can be operated by using merely the CCITT standard keys without the need for other non-standard function keys.

20 Claims, 7 Drawing Sheets

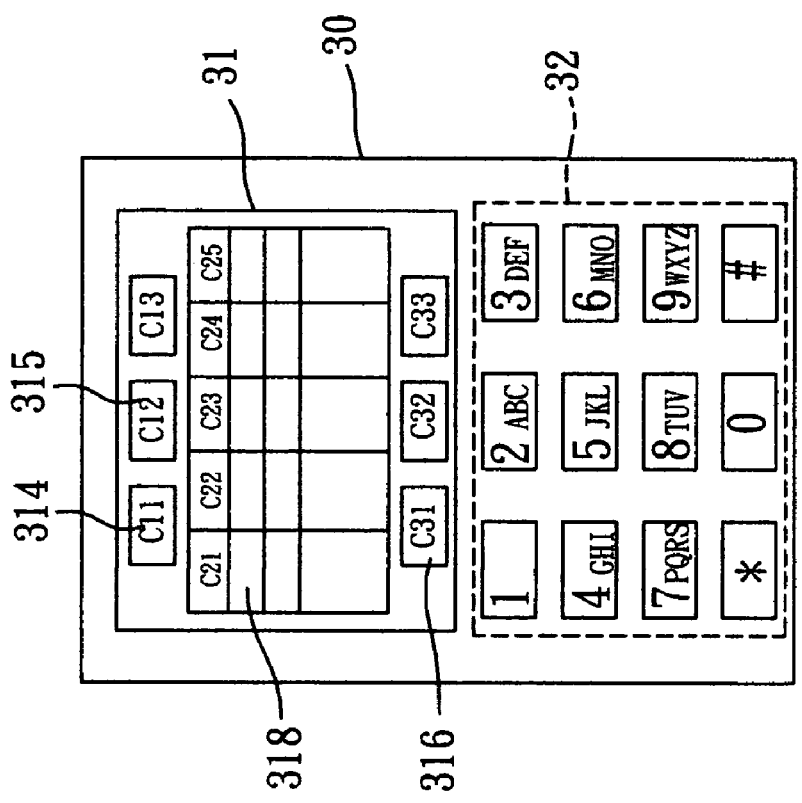
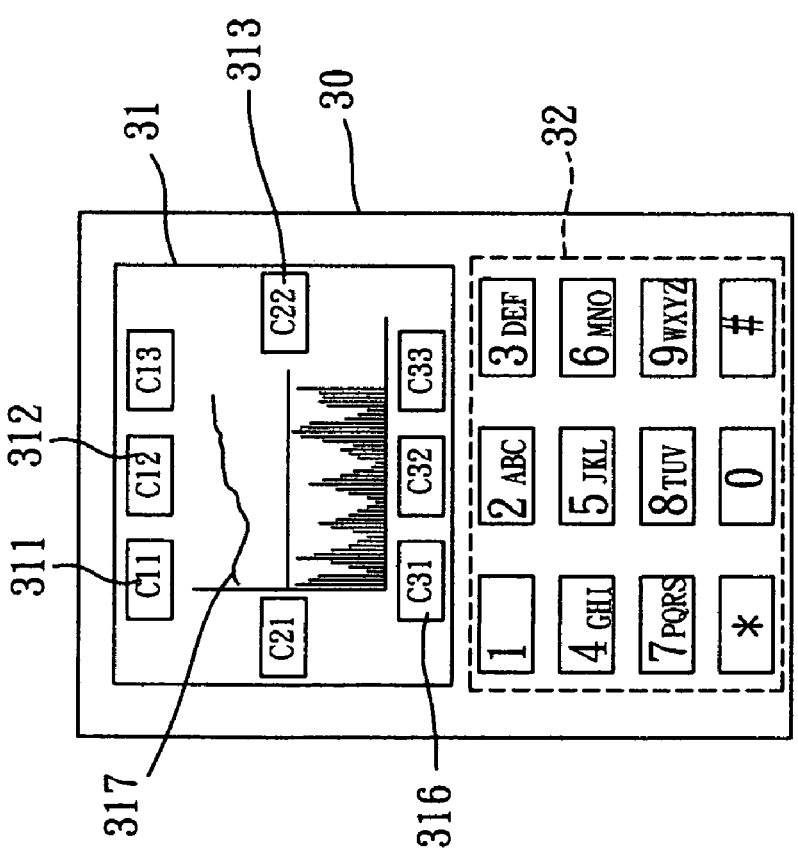

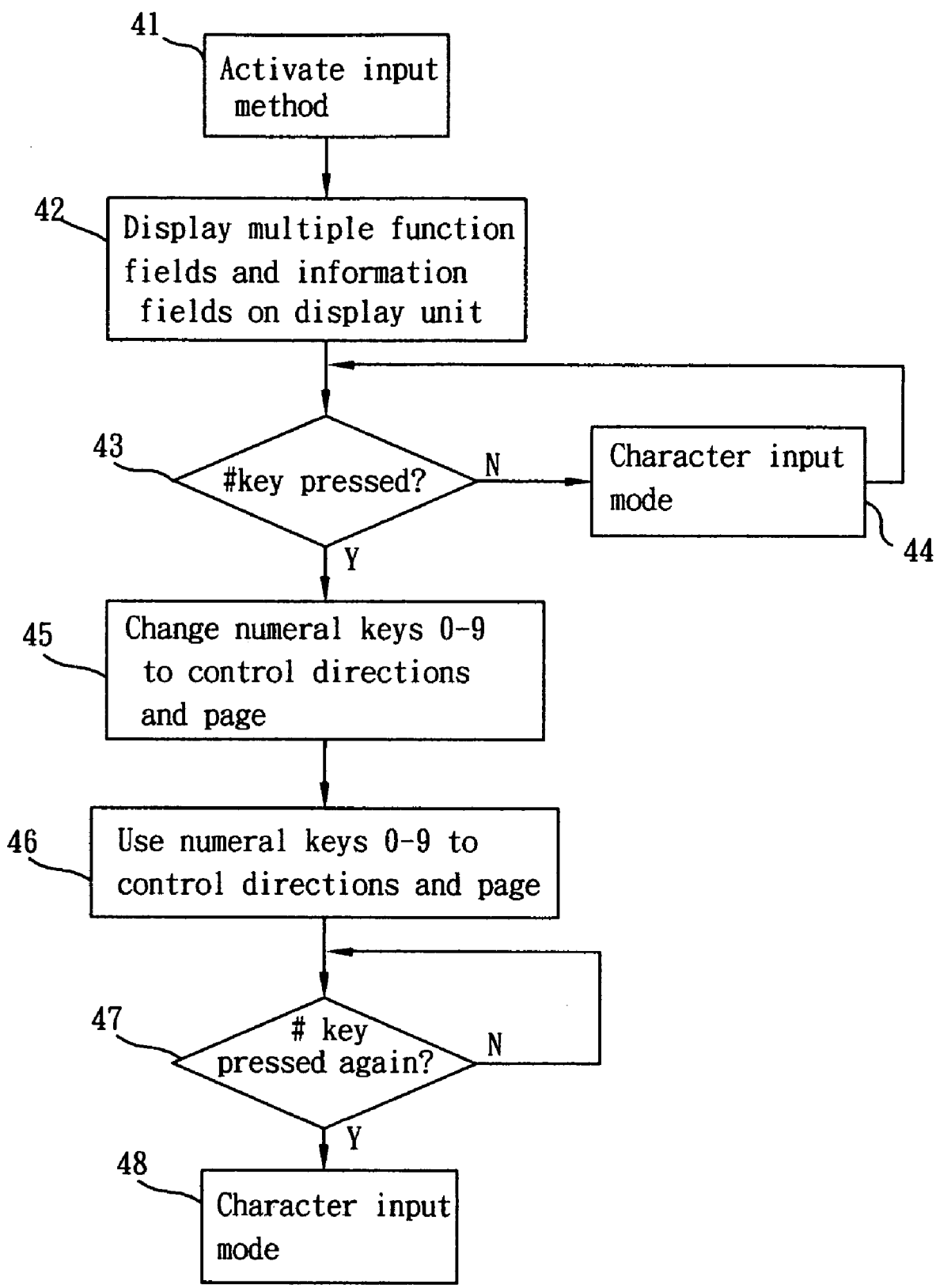
F I G. 6

INPUT METHOD USING STANDARD NUMERIC KEYPAD

BACKGROUND OF INVENTION

1. Field of the Invention

The present invention relates to an input method using standard numeric keypad, in particular an input method applicable to portable wireless communication devices that uses only CCITT standard numeral keys to carry out the shifting and execution of functions.

2. Description of the Prior Art

Along with the swift advance of information technology, the demands for instant and convenient access to information and communications undergo explosive growth. A wide varieties of portable wireless communication products that offer multiple functions, such as mobile phone, smart phone, and personal digital assistant (PDA) with wireless communication functions, have been developed to meet the needs and convenience of daily living.

New generations of mobile phone and PDA offer many extra functions in addition to making calls, for example, receiving and viewing stock information, placing orders to buy/sell stocks, directory, calendar, mobile secretary, webpage browsing, receiving and sending e-mail, and games. Those functions require the input of numerals, alphabets or characters and the use of additional function keys (e.g. arrow key, execution key and shift key) in order to execute the functions commanded by non-character input.

FIG. 1 shows the diagram of a conventional handset 9. Generally the front of handset 9 carries a standard numeric keypad 91 that comply with the standards of Consultative Committee of International Telegraph and Telephone (CCITT) and several non-standard function keys 92. Said CCITT standard numeric keypad 91 typically has 10 numeral keys from 0 to 9 and two symbol keys * and #. The key values of the keys on CCITT standard numeric keypad 91 are CCITT-defined and common standards. Thus even if handsets 9 made by different manufacturers have different specifications, the key values of their CCITT standard numeric keypad 91 are the same and universal. On the other hand, those non-standard function keys 92, such as arrow key, call button and end-call button are designed by the manufacturer. Given that the key values of function keys 92 are not standardized, the function keys on handsets of different brands or models are not universal.

For conventional handset 9, the CCITT standard numeric keypad 91 is used specifically for numeral, alphabet or character input, while function keys 92 are used to switch menu and execute specific functions. For example, by pressing the up/down or left/right arrow keys, one can switch around function options 931, 932 and 933 displayed on the screen of handset 9 and then execute the selected function by pressing the call button in function keys 92. The character data may also be input using the CCITT standard numeric keypad 91. In all, the execution of added functions offered by conventional handset 9 inevitably requires the use of non-standard function keys 92. That means when a software developer develops a new software applicable to handset 9 (e.g. placing stock trade or viewing stock information), the developer has to rewrite the source code for handsets 9 of different brands and specifications to accommodate the different key values of non-standard function keys 92. Such process is inconvenient and adds to the cost of software development.

A virtual keypad method has been disclosed, which combines the CCITT standard keypad with several added function keys to improve the convenience of character input. Since the known use of CCITT standard keypad is for "character input" only, while the shift between functions still relies on the use of other non-standard function keys, such virtual keypad still requires the rewrite of source code for handsets of different brands and specifications, hence lacking the technical features as disclosed in the present invention.

SUMMARY OF INVENTION

The primary object of the present invention is to provide an input method using standard numeric keypad that only CCITT standard numeric keypad is needed for performing the shift and execution of functions without the use of other non-standard function keys.

Another object of the present invention is to provide an input method using standard numeric keypad that can execute the predetermined added functions on portable wireless communication devices of different brands and specifications without the needs to rewrite its source code for each such device. For developers of software for portable wireless communication devices, the input method provided herein makes the application of software more convenient and helps lower the cost of software development.

To achieve the aforesaid objects, the input method using standard numeric keypad as disclosed herein comprises the following steps:

reassigning at least a first CCITT key value with an actuating key value of a first function;

checking if the first CCITT key value is input, if "YES" then actuating the first function which reassigns every CCITT key value with a new input key value of predetermined function; and checking if any CCITT key value is input, if "YES" then performing the predetermined function corresponding to that input CCITT key value based on the first function.

Preferably the input method disclosed herein is applied to a portable wireless communication device (e.g. mobile handset), which comprises a plurality of CCITT standard keys, a plurality of non-standard keys, a wireless signal transmission unit, a sound unit, a memory unit, a control unit, and a display unit. The execution of said input method can display multiple function fields and data fields on the display unit, and each function field corresponds to a predetermined function, characterized in which the each predetermined function corresponding to the function field can be executed by using the plurality of CCITT standard keys, while the operation of non-standard keys is unable to control or execute any of the predetermined functions.

BRIEF DESCRIPTION OF THE DRAWINGS

FIG. 4 shows the diagram of the first example of handset display when the input method according to the present invention is used by a stock trading software for handsets.

FIG. 5 shows the diagram of the second example of handset display when the input method according to the present invention is used by a stock trading software for handsets.

FIG. 6 shows the operational flow chart for the first preferred embodiment of the input method according to the present invention being used in a stock trading software for handsets.

DETAILED DESCRIPTION

Figure 1:
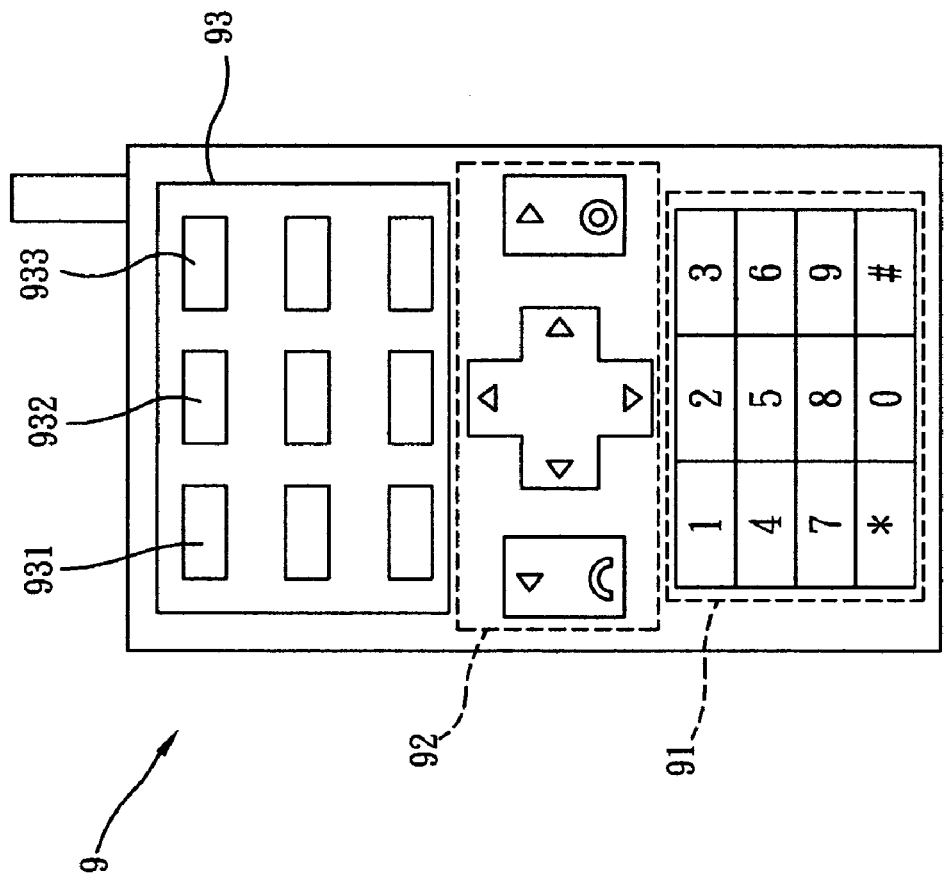
FIG. 1 shows a diagram of a conventional handset.
Figure 2:
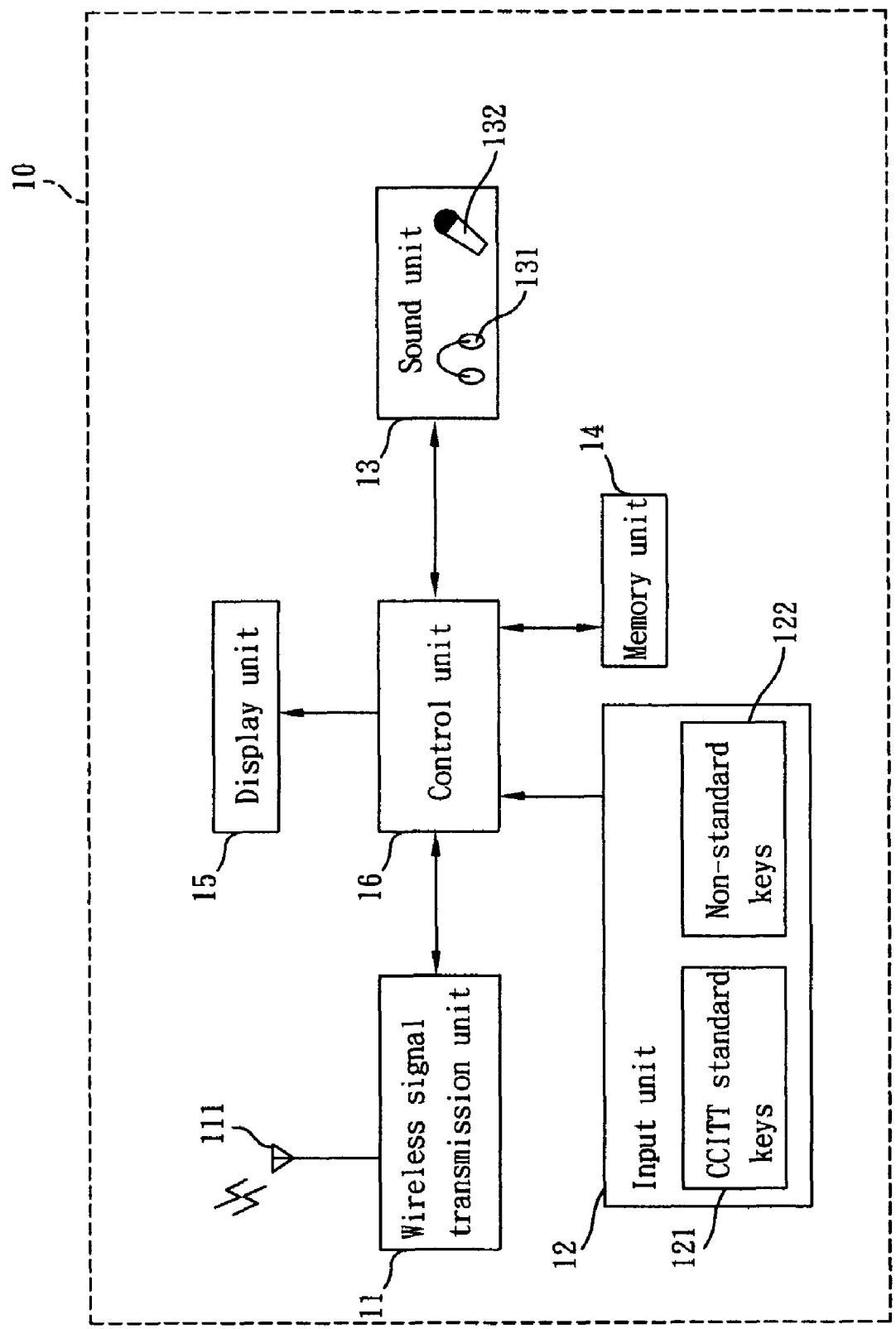
FIG. 2 shows a diagram of the hardware framework of a typical portable wireless communication device to which the input method disclosed in the present invention applies.

Referring to FIG. 2 which shows the diagram of hardware framework of a typical portable wireless communication device 10 to which the input method using standard numeric keypad disclosed herein can be applied to execute the character input of predetermined extra functions, shift of function, execution of function, and switch of display page. In this embodiment, the portable wireless communication device 10 is a mobile handset, smart phone, or a personal digital assistant with wireless communication functions, consisting of a wireless signal transmission unit 11, an input unit 12, a sound unit 13, a memory unit 14, a display unit 15, and a control unit 16.

The wireless signal transmission unit 11 comprises an antenna circuit 111 for receiving and transferring wireless signals of predetermined communication protocol, for example, wireless signals that conform to GSM or GPRS communication protocol.

The input unit 12 provides a man-machine interface for user to operate the portable wireless communication device 10, which consists of a plurality of CCITT standard keys 121 and several "non-standard" function keys 122, wherein the plurality of CCITT standard keys are in total twelve keys including ten numeral keys from 0 to 9 and two symbol keys * and #. Each CCITT standard key 121 corresponds to a CCITT key value. The key values of the plurality of CCITT standard keys 121 are CCITT defined and are universal standard values, which are the same for portable wireless communication device 10 of different specifications made by different manufacturers. The function keys 122 are keys defined by individual manufacturers. Thus their key values might differ, thereby not common among portable wireless communication devices 10 of different specifications made by different manufacturers.

The sound unit 13 consists of a loudspeaker device 131 and a microphone 132 for playing or receiving sound signals.

The memory unit 14 is for storing data and software programs. Generally the memory unit 14 is made of non-volatile memory, e.g. flash memory or electric programmable read only memory (EPROM), but it can also be a micro-HD (micro hard disk).

The display unit 15 is for displaying the operating state, function field options, and information page of the portable wireless communication device 10 that allows user to control and choose the operating state, function field options, and information page displayed through input unit 12 to achieve the purposes of operating the portable wireless communication device 10, executing specific function, or inputting data. In this embodiment, the display unit 15 contains a liquid crystal display (LCD).

The control unit 16 is connected to the wireless signal transmission unit 11, input unit 12, sound unit 13, memory unit 14, and display unit 15 for the computation and processing of signals and data, thereby controlling the actuation of those units. In this embodiment, the control unit 16 contains a microprocessor.

In this embodiment, the input method is stored in the memory unit 14 of the portable wireless communication device 10 in the form of a software. When the input method (software) is not executed, the portable wireless communication device 10 is in regular operating state. That is, the plurality of CCITT standard keys 121 are used specifically for the input of character data (e.g. data input or making calls), while the shift between added functions (e.g. checking directory data, setting change, scrolling the display page) requires the use of other non-standard function keys 122.

Once the input method of the present invention is executed (activated), the predetermined added functions will also be activated and the key values of the plurality of CCITT standard keys 121 will be reassigned. In this embodiment, the input method is added to a software for placing stock trades or viewing stock information. As such, when the input method is executed, the added function of stock trade placement or stock information viewing is also executed, only the operation of those added functions is executed according to the input method provided herein.

Figure 3:
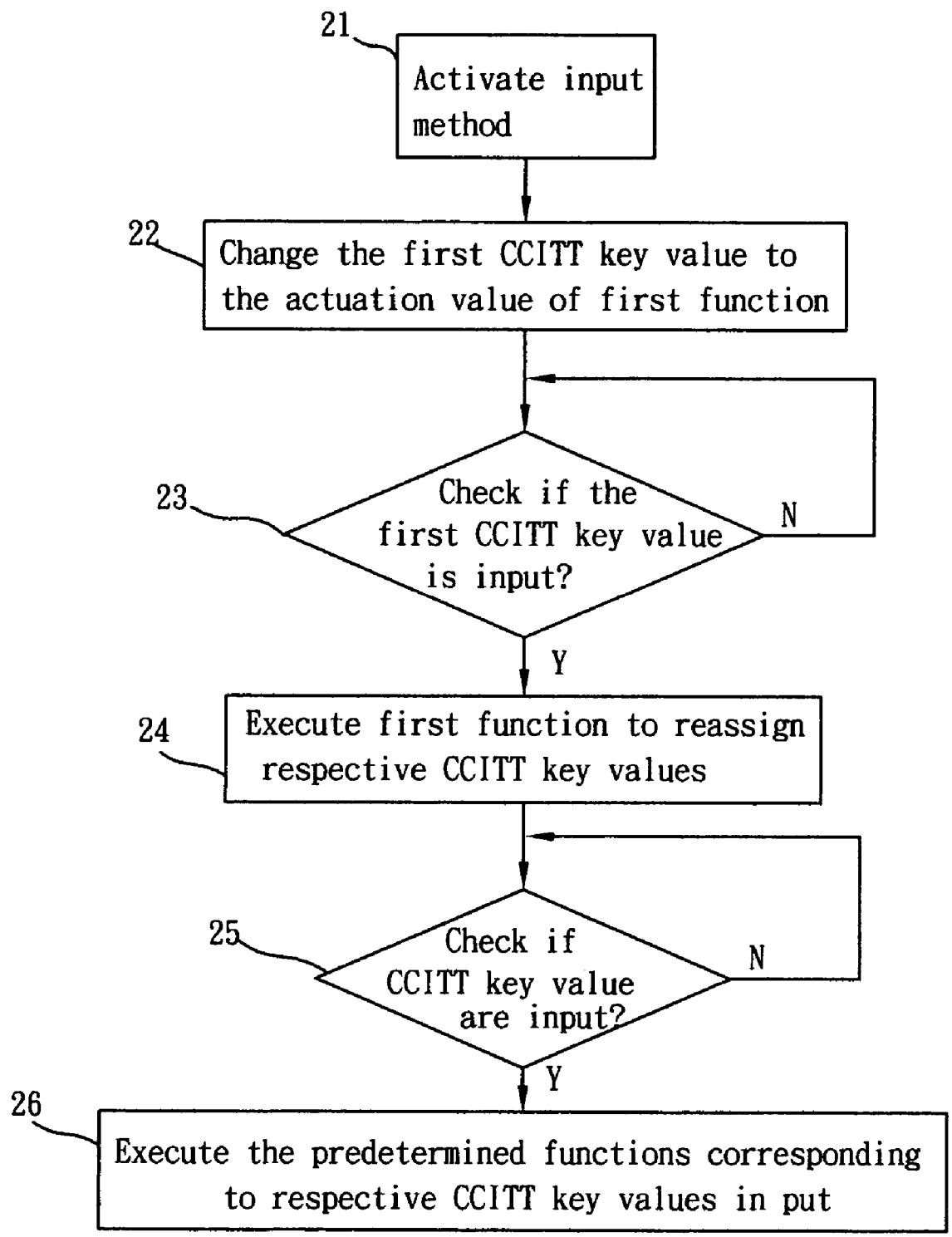
FIG. 3 shows the flow chart of a preferred embodiment of the input method using standard numeric keypad according to the present invention.

FIG. 3 shows the flow chart of a preferred embodiment of the input method using standard numeric keypad according to the present invention. The input method comprises the following steps:

Step 21: Activating the input method;

Step 22: Reassigning at least a first CCITT key value with an actuating key value of a first function;

Step 23: checking if the first CCITT key value is input, if "NO", then keep it in standby state; if "YES", then actuate the first function which reassigns every CCITT key value with a new input key value of predetermined function (Step 24). Thus when the first CCITT key value is input, the plurality of CCITT standard keys are no longer used for inputting character data, but function keys for executing predetermined functions; and Step 25: checking if any CCITT key value is input, if "YES" then performing the predetermined function corresponding to that input CCITT key value based on the first function (Step 26). When the input key value is not a CCITT standard key but other non-standard function key, the input is unable to control any of the functions executed by the input method, but still might control the other functions of the portable wireless communication device 10, such as power off and receiving calls.

In this embodiment, user can turn on and turn off the first function by repeatedly inputting the first CCITT key value (i.e. pressing the first CCITT key repeatedly). That is, the first function is turned on by pressing the key once, and turned off when the key is pressed again, and so on.

It is clear from the steps described above that after the input method provided herein is activated, the user can still input characters with the plurality of CCITT standard keys according to prior art by keeping the first function in "off" state. When the user desires to execute added functions of non-character input, e.g. move the arrow key, delete characters, browse information, select stock, place order or display page shift key, he only needs to input the first CCITT key value to execute the first function and then proceed to select and execute the added functions using the plurality of CCITT standard keys. As such, the input method of the present invention and the software for placing stock trades or viewing stock information that contains the input method can be fully controlled and operated using only the twelve CCITT standard keys (i.e., numeral keys 0-9 and the symbol keys of * and #) without the needs for using other non-standard function keys. Also as the values of those CCITT standard keys are universal, software developers can easily apply this input method to portable wireless communication devices of different specifications made by different manufacturers without the needs to modify the source code to accommodate the non-standard function keys of different specifications, thereby greatly enhancing the convenience of software application and reducing the cost of development.

In the other embodiments described below, the great majority of components and steps are the same or similar to the aforesaid embodiment, which will retain the same names and numbers without elaboration.

FIG. 4 to FIG. 8 show several examples of actually applying the input method disclosed herein to stock trading software for handsets.

FIG. 4 and FIG. 5 shows respectively the first example and second example of handset 30 display where the input method disclosed herein is applied to stock trading software for handsets. As shown, when the input method of the present invention is activated, the display unit 31 of handset 30 will display multiple function fields 311, 312, 313, 314, 315, and 316 as well as information fields 317 and 318. Each function field 311, 312, 313, 314, 315, and 316 corresponds to a predetermined function (e.g. display the chart of individual stock, display real-time prices, display the chart of market performance, display basic data of individual stocks, display major news, and activate the function of order placement). The predetermined function will be actuated by selecting and executing the corresponding function field. The information fields 317 and 318 are for displaying specific information (e.g. real-time quote, technical chart, individual stock data, news, etc.) or for user to input data (e.g. input stock code, input ask/bid price, or set personal portfolio). Usually the handset 30 will have other non-standard function keys (e.g. dialing key, off key, arrow key, etc.) in addition to the twelve CCITT standard keys 32 (numeral keys 0-9 and symbol keys * and #) as shown in the figures. But once the input method is activated (unless the input method is shut off), none of those non-standard function keys will be used. Therefore, the non-standard function keys are omitted in FIG. 4 and FIG. 5 to preclude mix-up with prior art.

FIG. 6 depicts the flow chart of the first example of applying the input method herein to the stock trading software for handset 30, which comprises the following steps:

Step 41: Activating the input method. At the same time, the stock trading software is activated and the display unit of handset shows multiple function fields and information fields (Step 42). In addition, reassigning the key value of the symbol key # of CCITT standard keys (i.e. the first CCITT key value as described above) to execute the reassignment of all CCITT key values with functional key values for performing predetermined functions (i.e. the first function as described above);

Step 43: Checking if the symbol key # is pressed; if "NO", keep the CCITT standard keys (except for symbol key #) in character input mode (Step 44); if "YES", reassign respectively the key values of numeral keys 0-9 in the CCITT standard keys with functional key values, such as arrow keys for up, down, left and right as well as page shift key (Step 45). That is, four numeral keys 4, 8, 6 and 2 in the CCITT standard keys are respectively redefined as arrow keys for left, up, right and down, while numeral keys 1, 7,. 9, and 3 are redefined as page shift keys for "last page", "first page", "previous page" and "next page", and numeral key 5 in the CCITT standard keys may be inactive or defined for other purpose. As such, user can use the numeral keys 0-9 in the CCITT standard keys to control the directions of cursor movement and page scrolling (Step 46) shown by the display unit;

Step 47: Checking if the symbol key # is again pressed; if "NO", keep the execution of Step 46; if "YES", close the function keys, and those CCITT key values return to the general mode of character input (Step 48) that allow the user to carry out data input according to prior art.

Figure 7:
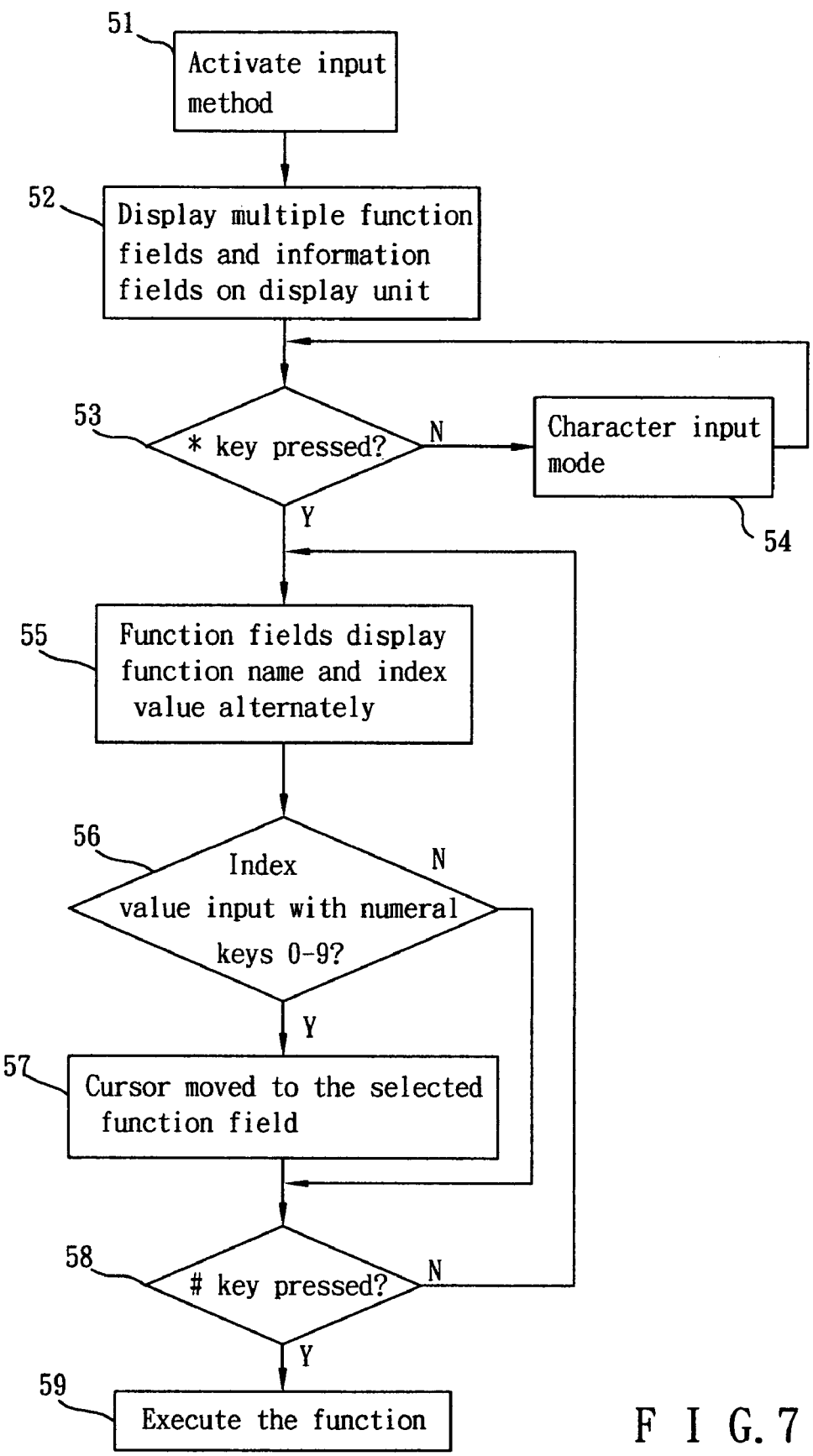
FIG. 7 shows the operational flow chart for the second preferred embodiment of the input method according to the present invention being used in a stock trading software for handsets.

FIG. 7 depicts the flow chart of the second example of applying the input method herein to the stock trading software for handset 30. In this example, the first function is an index input function and each function field has a corresponding index value, where the index value is input using the ten numeral keys in the CCITT standard keys to select one of the multiple function fields. The second example of the input method disclosed herein comprises the following steps:

Step 51: Activating the input method. At the same time, the stock trading software is activated and the display unit of handset shows multiple function fields and information fields (Step 52);

Step 53: Checking if the symbol key * is pressed; if "NO", keep the CCITT standard keys (except for symbol key *) in character input mode (Step 54); if "YES", the function fields displayed by the display unit begin to alternately display the corresponding function name and location index value (Step 55). At the same time, the CCITT key values are redefined to index value input mode;

Step 56: Checking if any of the CCITT key values 0-9 is input and the input key value conforms to a certain index value; if "NO", execute Step 58 directly; if "YES", move the cursor to the function field corresponding to said index value (Step 57);

Step 58: Checking if the symbol key # is pressed; if "NO", return to execute Step 55; if "YES", execute the predetermined function corresponding to the function field at where the cursor is located (Step 59).

The user can close this input mode by pressing the symbol key * again.

Figure 8:
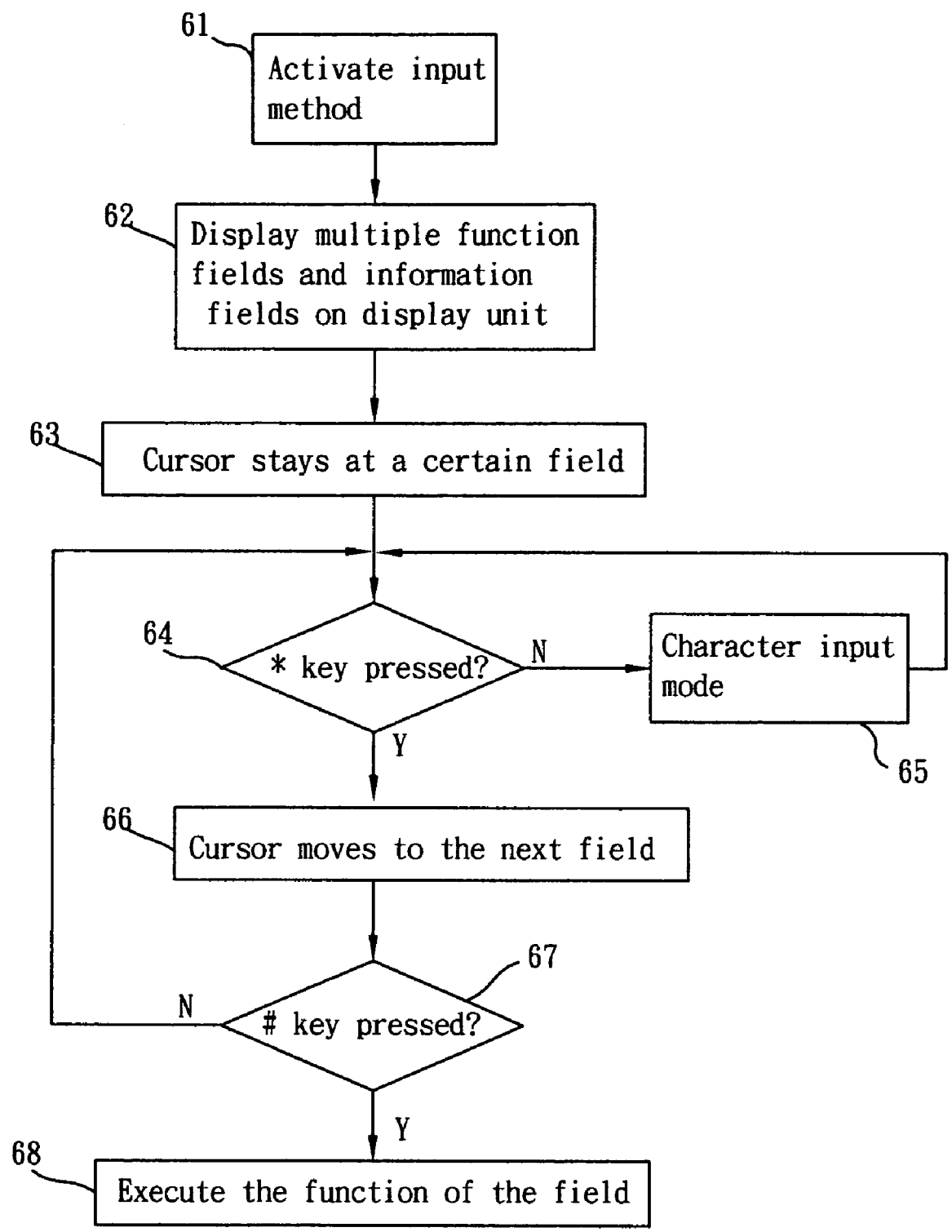
FIG. 8 shows the operational flow chart for the third preferred embodiment of the input method according to the present invention being used in a stock trading software for handsets.

FIG. 8 illustrates the flow chart of the third example of applying the input method herein to the stock trading software for handset 30. In this example, the input method reassigns a second CCITT key value with a key value that can carry out function field shift; when the second CCITT key value is repeatedly input, it allows the shift between function fields and the first function is the predetermined function represented by the selected function field. The third example of the input method disclosed herein comprises the following steps:

Step 61: Activating the input method. At the same time, the stock trading software is activated and the display unit of handset shows multiple function fields and information fields (Step 62). In addition, on the display unit, a cursor stops at a certain field (function field or information field) (Step 63);

Step 64: Checking if the symbol key * is pressed; if "NO", keep the CCITT standard keys (except for symbol key *) in character input mode (Step 65); if "YES", move the cursor to the next field (Step 66), while the CCITT-defined 0-9 numeral keys remain in character input mode;

Step 67: Checking if the symbol key # is pressed; if "NO", return to execute Step 64; if "YES", execute the predetermined function corresponding to the function field at where the cursor is located (Step 68).

The user can close this input mode by pressing symbol key * again.

In the fourth example not shown in the figure, after the first CCITT key value (e.g. the # symbol key value) is input to execute the first function (e.g. the function of reassigning the CCITT key values), the input method herein can further reassign a second CCITT key value (e.g. the * symbol key value) with a key value of delete function, and delete the last character of string input earlier by inputting the second CCITT key value.

As described above, the input method disclosed herein only needs to use CCITT standard numeric keypad to execute function shift and character input without the use of other non-standard function keys. Thus software that uses this input method is applicable to all kinds of portable wireless communication device with CCITT standard numeric keyboard without rewriting its source code for devices of different brands or specifications, which renders the application of software more convenient and helps reduce the cost of software development, hence overcoming the drawbacks of prior art.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An input method using standard numeric keypad which complies with CCITT standard and comprises a plurality of CCITT standard keys, each CCITT standard key having a corresponding CCITT key value, wherein the input method comprises the steps of:
   activating the input method;
   reassigning at least a first CCITT key value with an actuating key value of a first function;
   checking if the first CCITT key value is input; if "YES", actuating the first function to reassign every CCITT key value with a new input key value of predetermined function; and
   checking if any CCITT key value is input; if "YES", performing the predetermined function corresponding to that input CCITT key value based on the first function.

2. The input method according to claim 1, wherein said plurality of CCITT standard keys has a total of twelve keys, including ten numeral keys from 0 to 9 and two symbol keys of * and #.

3. The input method according to claim 2, wherein all functions of said input method is operated by using only the CCITT standard keys, while the input of non-standard key value is unable to control any of the functions executed by said input method.

4. The input method according to claim 2, wherein said first CCITT key value is either * or # symbol key.

5. The input method according to claim 2, wherein said first function is arrow key function, and when said first function is actuated, four numeral keys 4, 8, 6, and 2 are redefined as arrow keys controlling the directions of left, up, right, and down respectively.

6. The input method according to claim 5, wherein when said first function is actuated, four numeral keys 1, 7, 9 and 3 are respectively redefined as switch keys to last page, first page, previous page, and next page.

7. The input method according to claim 1, wherein said input method is applied to a portable wireless communication device which comprises a CCITT standard keypad, a plurality of non-standard keys, a wireless signal transmission unit, a sound unit, a memory unit, a control unit, and a display unit; when said input method is executed, the display unit shows multiple function fields and information fields, and each function field corresponds to a predetermined function.

8. The input method according to claim 7, wherein the function fields and information fields displayed by executing said input method contain stock related information.

9. The input method according to claim 7, wherein said input method can further reassign a second CCITT key value with a key value of function shift such that when said second CCITT key value is repeatedly input, it allows the shift between multiple function fields to select one of the fields.

10. The input method according to claim 7, wherein said first function is an index input function and each function field has a corresponding index value, which is input through the ten numeral keys from 0 to 9 of the plurality of CCITT standard keys to shift to one of the multiple function fields.

11. The input method according to claim 7, wherein said input method further reassigns a second CCITT key value with a key value of delete function such that the last character of the string input earlier is deleted by inputting said second CCITT key value.

12. An input method using standard numeric keypad applicable to a portable wireless communication device, wherein said portable wireless communication device comprises a plurality of CCITT standard keys, a plurality of non-standard keys, a wireless signal communication unit, a sound unit, a memory unit, a control unit and a display unit; when said input method is executed, the display unit will show multiple function fields and information fields, and each function field corresponds to a predetermined function, characterized in which the predetermined functions corresponding to said function fields may be performed by operating said plurality of CCITT standard keys, while the operation of non-standard key is unable to control or perform any of the predetermined functions.

13. The input method according to claim 12, wherein each CCITT standard key corresponds respectively to a CCITT key value, and said input method comprises the steps of:
   reassigning at least a first CCITT key value with an actuating key value of a first function;
   checking if the first CCITT key value is input; if "YES", actuating the first function to reassign every CCITT key value with a new input key value of predetermined function; and
   checking if any CCITT key value is input; if "YES", performing the predetermined function corresponding to that input CCITT key value based on the first function.

14. The input method according to claim 13, wherein said plurality of CCITT standard keys has a total of twelve keys, including ten numeral keys from 0 to 9 and two symbol keys of * and #.

15. The input method according to claim 14, wherein the first CCITT key value is either * or # symbol key.

16. The input method according to claim 13, wherein said first function is arrow key function, and when said first function is actuated, four numeral keys 4, 8, 6, and 2 are redefined as arrow keys controlling the directions of left, up, right, and down respectively, such that one of the multiple function fields may be selected using the four arrow keys.

17. The input method according to claim 16, wherein when said first function is actuated, four numeral keys 1, 7, 9 and 3 are respectively redefined as switch keys to last page, first page, previous page, and next page.

18. The input method according to claim 13, wherein the function fields and information fields displayed by executing said input method contain stock related information.

19. The input method according to claim 13, wherein said input method can further reassign a second CCITT key value with a key value of function shift, such that when said second CCITT key value is repeatedly input, it allows the shift between function fields to select one of the fields, and said first function is the predetermined function represented by the function field selected.

20. The input method according to claim 13, wherein said first function is an index input function and each function field has a corresponding index value, which is input through the ten numeral keys from 0 to 9 of the plurality of CCITT standard keys to shift to one of the multiple function fields.

* * * * *